(12) United States Patent
Francessetti et al.

(10) Patent No.: US 10,594,203 B2
(45) Date of Patent: Mar. 17, 2020

(54) SYSTEM AND METHOD FOR THE CONVERSION OF DC ELECTRIC POWER INTO THREE-PHASE AC ELECTRIC POWER, WITH FILTERING MEANS

(71) Applicants: IFP Energies nouvelles, Rueil-Malmaison (FR); MAVEL S.r.l., Pont Saint Martin (AO) (IT)

(72) Inventors: Marco Francessetti, Borgaro Torinese (IT); Davide Bettoni, Settimo Vittone to Italy (IT); Wissam Dib, Suresnes (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/311,269

(22) PCT Filed: Jun. 16, 2017

(86) PCT No.: PCT/EP2017/064809
§ 371 (c)(1),
(2) Date: Dec. 19, 2018

(87) PCT Pub. No.: WO2017/220447
PCT Pub. Date: Dec. 28, 2017

(65) Prior Publication Data
US 2019/0245427 A1    Aug. 8, 2019

(30) Foreign Application Priority Data

Jun. 22, 2016 (FR) ...................................... 16 55813

(51) Int. Cl.
*H02M 1/08* (2006.01)
*H02M 1/34* (2007.01)
(Continued)

(52) U.S. Cl.
CPC ............... *H02M 1/08* (2013.01); *H02M 1/34* (2013.01); *H02M 7/537* (2013.01); *H02P 27/06* (2013.01);
(Continued)

(58) Field of Classification Search
CPC .......... H02M 1/425; H02M 3/02; H02M 3/04; H02M 3/16; H02M 3/33584; H02M 7/00;
(Continued)

(56) References Cited

U.S. PATENT DOCUMENTS

| 4,730,242 A * | 3/1988 | Divan ................. H02M 5/4585 363/127 |
| 4,864,483 A * | 9/1989 | Divan ................. H02M 5/4585 363/37 |

FOREIGN PATENT DOCUMENTS

| DE | 10020137 A1 | 10/2001 |
| WO | 84/00858 A1 | 3/1984 |
| WO | 2011/016854 A1 | 2/2011 |

OTHER PUBLICATIONS

International Search Report for PCT/EP2017/064809, dated Sep. 6, 2017; English translation submitted herewith (5 pgs.).
(Continued)

*Primary Examiner* — Antony M Paul
(74) *Attorney, Agent, or Firm* — Fitch, Even, Tabin & Flannery LLP

(57) ABSTRACT

The present invention relates to a system for the conversion of DC electric power into three-phase electric power comprising three commutation arms (A, B, C), a modulation circuit, an electrical energy recovery module (8) and filtering means (7). The filtering means (7) comprise a capacitor (Cf) and an assembly formed from a filtering coil (Lf) connected in series with a diode (D).

23 Claims, 3 Drawing Sheets

(51) Int. Cl.
    *H02M 7/537*      (2006.01)
    *H02P 27/06*      (2006.01)
    *H02M 7/48*       (2007.01)
    *H02M 1/00*       (2006.01)

(52) U.S. Cl.
    CPC ...... *H02M 7/48* (2013.01); *H02M 2001/0058* (2013.01); *H02M 2001/342* (2013.01); *H02M 2001/346* (2013.01); *Y02B 70/1491* (2013.01)

(58) Field of Classification Search
    CPC ......... H02M 11/00; H02M 2001/0048; H02M 2007/4815; H02P 27/04; H02P 27/06; H02P 1/00; H02P 1/04; H02P 1/46; H02P 1/24; H02P 1/26; H02P 1/265; H02P 1/28; H02P 1/423; H02P 1/44; H02P 1/445; H02P 3/00; H02P 3/06; H02P 4/00; H02P 5/00; H02P 6/00; H02P 6/001; H02P 6/002; H02P 6/14; H02P 6/142; H02P 6/186; H02P 6/187; H02P 6/24; H02P 11/00; H02P 13/00; H02P 21/00; H02P 21/0035; H02P 21/0046
    USPC ......... 318/400.01, 400.02, 400.14, 700, 701, 318/727, 800, 801, 490, 400.26, 400.27
    See application file for complete search history.

(56) References Cited

OTHER PUBLICATIONS

Taufiq J A: "Advanced inverter drives for traction" Jan. 1, 1993, Jan. 1, 1993, pp. 224-228, XP006511671, figures 7, 8b p. 226

* cited by examiner

SYSTEM AND METHOD FOR THE CONVERSION OF DC ELECTRIC POWER INTO THREE-PHASE AC ELECTRIC POWER, WITH FILTERING MEANS

CROSS REFERENCE TO RELATED APPLICATIONS

Reference is made to PCT/EP2017/064809 filed Jun. 16, 2017, and French Application No. 16/55.813 filed Jun. 22, 2016, which are incorporated herein by reference in their entirety.

BACKGROUND OF THE INVENTION

Field of the Invention

The present invention relates converters for the conversion of electrical energy, specifically for at least one of high-speed and variable-speed electrical machines.

Description of the Prior Art

A static converter is a system which permits the conversion of an electrical signal into another electrical signal having different characteristics. For example, a converter can permit the conversion of an alternating voltage into another alternating voltage of at least one of a different frequency and amplitude, described as an alternating/alternating or AC/AC converter. According to a further example, a converter can permit the conversion of an alternating voltage into a direct voltage, described as an alternating/direct or AC/DC converter. The device used for the inverse conversion of a direct to an alternating voltage is described as a DC/AC converter. According to a final example, a converter can convert a direct voltage into a direct voltage of a different rating, described as a DC/DC converter. Converters can be reversible or non-reversible. In general, conversion is deployed by use of controlled commutators (switches).

For the operation of electrical machines, specifically permanent-magnet electrical machines, using a stored electrical energy system or systems (for example a battery), it is necessary to convert the DC electrical energy into three-phase AC energy. This conversion can be achieved by use of a DC/AC converter. A converter of this type is required to supply three sinusoidal electric voltages with a mutual phase displacement of 120°, having an amplitude which is directly dependent upon the torque required (but also upon the speed of rotation), and the frequency of which is exclusively dependent upon the speed of rotation of the electrical machine connected to the converter.

Conventionally, a DC/AC converter comprises three commutation arms. Each commutation arm comprises two controlled commutators and two diodes arranged in parallel with the controlled commutators. Depending upon the required current load, an arm may be comprised of a plurality of "sub-arms" arranged in parallel. The phases of the electrical machine are connected to the mid-point of each arm. Each arm is controlled separately by actuating the opening and closing of the commutators over cut-out intervals in order to generate a three-phase signal.

FIG. 1 illustrates a conventional DC/AC converter of this type. The DC voltage of the electrical energy storage is indicated by Udc. The three-phase motor M is represented schematically by three coils which are supplied respectively by the currents Ia, Ib and Ic. The converter comprises three commutation arms A, B, C with each commutation arm A, B, C being connected to one phase of the electrical machine M. Each commutation arm comprises two commutators 1 and two diodes 2. The commutation arms A, B, C are arranged in parallel between the two DC input phases of the voltage converter Udc. The output phases of the commutation arms A, B, C are connected to the mid-point of the commutation arms (between the two commutators).

FIG. 2 represents the command signal COM on the switches with a constant cyclic ratio of 50%, a voltage Udc and a current Icon the terminals of a commutator, in a conventional DC/AC converter (as described above with reference to FIG. 1). In the command signal COM, the lower part of the rectangular pulse corresponds to the open commutator, and the upper part of the rectangular pulse corresponds to the closed commutator. This type of commutation is described as hard or 'on/off' (or "hard switching"). It is observed that, in this design of converter, overshoots of the voltage Udc and of the current Io occur. The current Io corresponds to the permanent value of Ic, and corresponds to the current transmitted to the electrical machine.

Accordingly, the main disadvantages of this conventional design of converter are as follows:
  switching losses: this design is associated with substantial switching losses, which tend to render the application thereof incompatible with high switching frequencies, and consequently with electrical machines operated at very high speeds,
  current/voltage overshoot: as represented in FIG. 2, this strategy involves voltage and current overshoots associated with the instantaneous commutation of the switch. Accordingly, this type of operation requires the incorporation of a margin for the voltage and current rating of the various components in the design of the converter (also described as an inverter). This involves the over-dimensioning of the components employed (for example: for a DC bus voltage of 300 V, an IGBT commutator with a rated voltage of 600 V is employed, in order to take account of these voltage and current overshoots), and
  substantial electromagnetic emissions (EMC).

Based upon the consideration of the disadvantages of the "hard switching" strategy (losses, incompatibility with high-speed motors), a "soft switching" design has been developed. Thus, in order to limit current and voltage overshoots on the commutators, a coil and a capacitor are added to the previous circuit. The coil modulates the variation in current di/dt ("turn-on"), and the capacitor modulates the variation in voltage dv/dt ("turn-off"). Moreover, in the interests of ensuring the operation of the circuit, and thus a zero energy balance, a resistor is added in the circuit between the voltage of the energy source employed and the capacitive circuit. This resistor ensures the operation of this circuit, and permits the pull-down of voltage on the terminal of the capacitive circuit. A DC/AC converter design of this type is specifically described in patent application WO 11016854.

FIG. 3 shows a simplified schematic diagram of a commutation arm (with two commutators 1) having a capacitor Cs, a coil Ls, a resistor R and a capacitor Cov for soft switching. This circuit is known by the English name "Undeland snubber". The voltage Udc corresponds to the voltage at the terminals of the DC electrical energy storage. The coil Ls is arranged between one DC input phase Udc and the commutation arm A. A branch departs from the junction of the coil Ls and the commutation arm A. This branch comprises two diodes D, and is routed to a junction of the resistor R and the capacitor Cov. The other end of the resistor R is connected to the DC input phase of the converter. The other end of the capacitor Cs is connected to the AC output phase of the commutation arm A. The other end of the capacitor Cov is connected to ground. The capacitor Cs permits the modulation of voltage movements at the terminals of the commutator. This capacitor stores a proportion of the energy associated with the soft switching of the switches. The remaining proportion of this energy is stored in a capacitor of higher rating Cov. The energy stored in the capacitor is then returned to the storage system employed (battery) via the resistor. The coil Ls permits the modulation of current movements at the terminals of the commutator. In practice, the energy generated by the coil Ls is not entirely stored in the capacitor Cs. Accordingly there is a need for a second capacitor Cov of a higher rating than Cs. The resistor ensures the operation of the system, and permits the pull-down of the voltage Vrec.

FIG. 4 represents, in a similar manner to FIG. 2, the commutation signal COM, and the movement in the voltage Udc and the current Ic on the commutator associated with "soft" switching. In the command signal COM, the lower part of the rectangular pulse corresponds to the open commutator, and the upper part of the rectangular pulse corresponds to the closed commutator. In this figure, it will be observed that overshoots of the voltage Udc and current Ic are reduced in relation to "hard" switching.

The advantages of soft switching are as follows:
reduced switching losses. This design of converter is compatible with high switching frequencies and, accordingly, this design can be used for the operation of high-speed electrical machines;
limited voltage and current overshoot on the commutator. Accordingly, no further requirement for the over-dimensioning of components; and
the movement of voltage and current at the terminals of the commutators during switchover. This is modulated by the selection of Ls and Cs respectively.

This design of converter requires a specific arrangement of the various electrical components, thus rendering the assembly thereof lengthy and complex. Moreover, this design of converter has a major disadvantage, in that it is necessary for energy to be dissipated in the resistor. The purpose is the achievement of a zero energy balance on the passive components. Consequently the pull-down of the voltage Vrec, has energy losses and consequently, a reduction in the efficiency of the converter.

Furthermore, another constraint on the design of the converter is its footprint, which must be limited.

SUMMARY OF THE INVENTION

In order to rectify these disadvantages, the present invention provides a system for the conversion of DC electric power into three-phase electric power comprising three commutation arms, a modulation circuit, an electrical energy recovery module and a filter. The filter comprises a capacitor and an assembly formed from a coil connected in a series with a diode. The combination of the diode with the coil makes it possible to choose a coil with a lower inductance, having reduced bulk. Moreover, by use of the modulation circuit, soft switching is deployed, which specifically reduces switching losses, together with voltage and current overshoots on the commutators. Moreover, the electrical energy recovery module permits the optimization of the efficiency of the converter.

The invention is a system for the conversion of DC electric power into three-phase electric power comprising three commutation arms, a modulation circuit for variations in voltage and current comprising one capacitor per AC output phase of the conversion system and a coil, and an electrical energy recovery module that is connected to the commutation arms and to the modulation circuit. The conversion system comprises a filtering circuit for each output phase of the conversion system including a capacitor and an assembly formed from a coil connected in series with a diode.

According to one embodiment, the coil has an inductance of between 0.5 and 50 microH.

Advantageously, the diode of the filtering circuit is a Schottky diode.

In accordance with one implementation, each assembly of the filtering circuit formed from the coil and the diode is mounted on a filtering module.

Preferably, each filtering module is mounted on a printed circuit board, which comprises the commutation arms, the modulation circuit and the electrical energy recovery module.

According to one variant of embodiment, the filtering circuit are positioned between the commutation arms and the electrical energy recovery module of the conversion system.

In accordance with one feature, the electrical energy recovery module includes at least one inductance and at least one commutator.

In accordance with one design, the electrical energy recovery module comprises three branches connected to a single junction point, with:
a first branch comprising a commutator,
a second branch comprising a diode, and
a third branch comprising an inductance.

Advantageously, the coil of the modulation circuit is positioned between a DC input phase of the conversion system and a junction of the commutation arms.

Preferably, each capacitor of the modulation circuit is connected to one AC output phase of the conversion system and to the junction between the coil of the modulation circuit, the commutation arms and a capacitor.

According to one variant, the electrical energy recovery module is positioned between a DC input phase of the conversion system and the junction between the commutation arm and the capacitor of the modulation circuit.

In accordance with one embodiment, each commutation arm includes two commutators and two diodes, the output phases of the conversion system are connected to the midpoint of each commutation arm.

Moreover, the conversion system may be bidirectional.

In addition, the invention relates to a motor system comprising at least one electrical energy storage and a three-phase electrical machine. The motor system comprises a conversion system according to one of the aforementioned characteristics, for the conversion of DC electrical energy from the electrical energy storage into three-phase AC electrical energy for the electrical machine.

BRIEF DESCRIPTION OF THE DRAWINGS

Further characteristics and advantages of the system according to the invention will be identified from the following non-limiting exemplary embodiments, with reference to the figures attached hereto and described hereinafter.

FIG. 5b illustrates an equivalent resistive model of the electrical energy recovery module shown in FIG. 5a.

DETAILED DESCRIPTION OF THE INVENTION

The present invention relates to a DC/AC conversion system (converter) for the conversion of DC electrical energy into three-phase AC electrical energy. Advantageously, the conversion system according to the invention can be bidirectional (reversible). Thus, by use of the conversion system according to the invention, three-phase AC energy can be converted into DC electrical energy.

Figure 1:
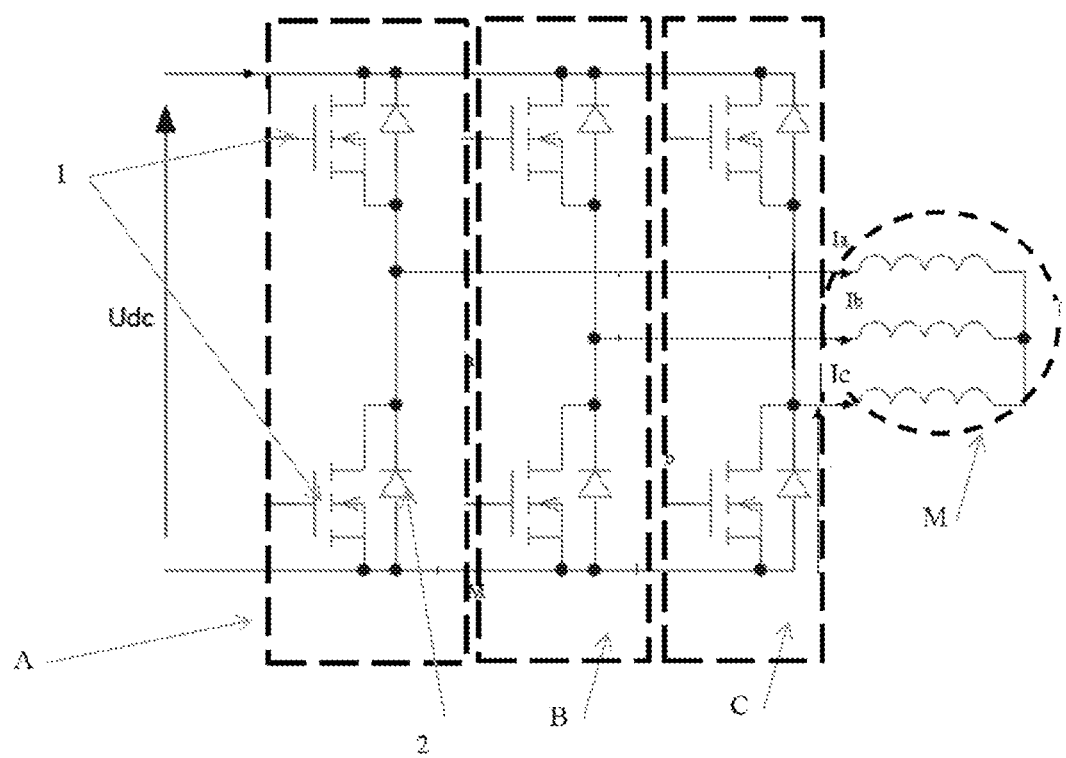
FIG. 1, which is already described, illustrates a conventional DC/AC converter, with hard switching, according to the prior art.
Figure 2:
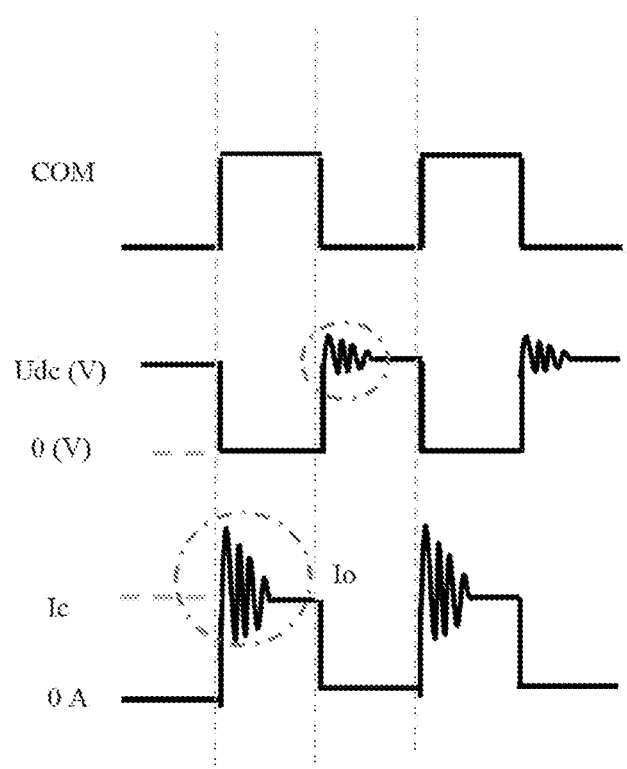
FIG. 2, which is already described, illustrates the commutation signal, the voltage and current in one phase of a DC/AC converter of the design illustrated in FIG. 1.

Conventionally, the conversion system according to the invention comprises three commutation arms, one DC input phase and three AC output phases. The design of the three commutation arms may be similar to that of the AC/DC converters according to the prior art. For example this design may be in accordance with the design of FIG. 1. Thus, each converter arm may comprise two controlled commutators (switches) and two diodes. The diodes are placed in parallel with the commutators, and permit the passage of the current in a single direction. In a known manner, the control of commutators permits the generation of an AC voltage. The output phases of the conversion system are connected to the mid-point of each commutation arm, that is between the two commutators.

According to one characteristic of the invention, the commutators can be at least one of MOSFETs (Metal Oxide Semiconductor Field Effect Transistor) and IGBTs (Insulated Gate Bipolar Transistor).

Preferably, the commutators are controlled by a pulse width modulation method (PWM). According to the general principle of this modulation method, by the application of a succession of discrete states over carefully selected time intervals, it is possible to achieve any average intermediate value over a given time interval.

The various embodiments described below may be combined, in interest of combining their effects and their advantages.

According to the invention, the conversion system moreover comprises a voltage and current modulation circuit. The voltage and current modulation circuit permits soft switching which restricts switching losses and current and voltage overshoots on the commutators. The modulation circuit comprises one coil, which modulates the current variation, and one capacitor per phase, for modulating the voltage variation.

Figure 3:
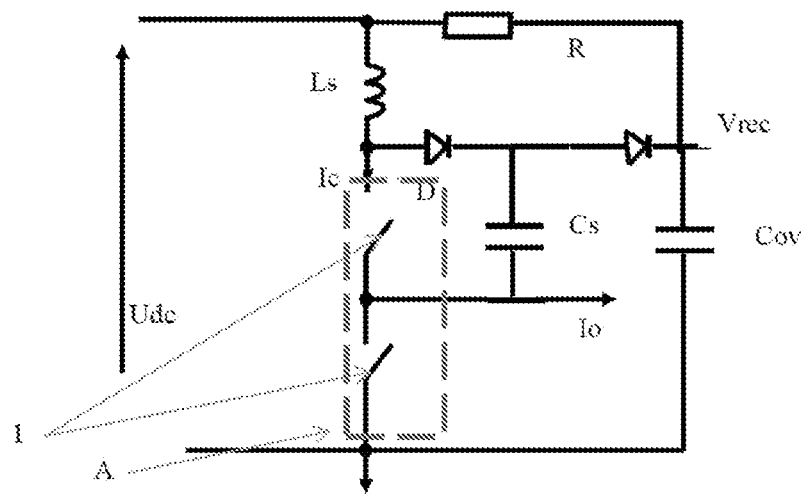
FIG. 3, which is already described, illustrates a DC/AC converter according to the prior art, with soft switching.
Figure 4:
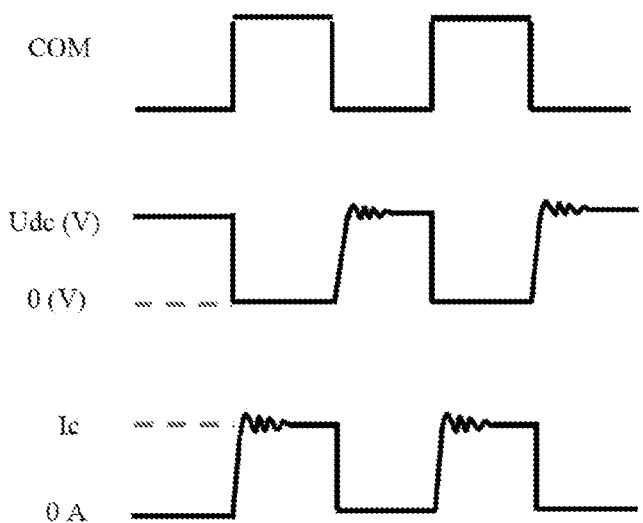
FIG. 4, which is already described, illustrates the commutation signal, the voltage and current in one phase of a DC/AC converter of the design illustrated in FIG. 3.

According to one embodiment of the invention, the modulation circuit comprises a modulating coil which connects one DC input phase of the commutation system and the commutation arms. Moreover, the commutation circuit includes one modulating capacitor per phase (hence three capacitors, one for each of the three commutation arms) that connects the AC output phase and the junction between the coil of the modulation circuit and the modulation arms. The coil modulates the variation in current di/dt ("turn-on"), and the capacitor modulates the variation in voltage dv/dt ("turn-off"). According to one exemplary embodiment, the design of the modulation circuit of the converter system according to the invention may correspond to the soft switching design illustrated in FIG. 3 without the resistor R. Moreover, in order to produce the three arms of the conversion system, this circuit may be repeated three times (once for each commutation arm). Additionally, the connections to the energy storage system and to the electrical machine may be similar to the connections of the conventional converter illustrated in FIG. 1.

According to the invention, the conversion system moreover comprises an electrical energy recovery module. The conversion system thus does not have a resistor, in which energy is dissipated according to the prior art. Conversely, the electrical energy recovery module, which replaces the resistor, permits the recovery of energy which is available or generated in conjunction with "soft switching", by the recovery of available energy associated with soft switching and the transmission thereof to electrical energy storage (for example a battery) connected to the DC phases of the conversion system. Electrical losses are thus substantially reduced. The electrical energy recovery module is connected to the commutation arm and to the modulation circuit.

According to the invention, the conversion system moreover comprises a filtering circuit. The filtering circuit permits the smoothing of voltages and currents in the AC output phases. In a known manner, the filtering circuit comprises, on each output phase of the converter, a coil and a filtering capacitor. Moreover, the filtering circuit comprises a diode, connected in series to the coil. In this manner, it is possible to reduce the inductance of the coil of the filtering circuit, which has the effect of reducing the footprint of the conversion system. In practice, in the absence of the diode, in order to ensure optimum filtering, it is necessary to employ a coil with a rating of several hundred microhenrys, which can have a footprint of the order of 10 cm by 5 cm. However, with the diode according to the invention, it is possible for the coil to have a rating of between 0.5 and 50 microhenrys, having a footprint on the order of 1 cm by 1 cm. A further effect of this reduction in the inductance of the coil is the reduction of generated heat, which permits the simplification of the cooling of the conversion system.

According to one form of the invention, each filtering circuit is arranged between a commutation arm and the electrical energy recovery module of the conversion system.

Preferably, the diode in series with the coil in the filtering circuit is a Schottky diode having a very low direct voltage threshold and a very short switching time. The diode is positioned to permit the passage of current from the commutation arm to the electrical energy recovery module. The diode permits the reduction or elimination of voltage spikes at the terminals of the electrical energy recovery module. Preferably, the diode is arranged after the filtering coil in the direction of current flow.

According to one embodiment of the invention, the combination formed by the coil and the diode of the filtering circuit is fitted into an independent filtering module. The term "module" describes an independent element in the form of a unit, which combines all the electronic components for the execution of a given function. This embodiment in the form of a module permits a simplified assembly, and ensures the modularity of the conversion system. Preferably, the filtering module may be mounted on a printed circuit board, which comprises the commutation arms, the modulation circuit and the electrical energy recovery module. Advantageously, the commutation arms may also be produced as modules, which one referred to power modules. Thus, the conversion system may be produced by assembling, on a printed circuit board, filtering modules (one per output phase), power modules (at least one per output phase) and an electrical energy recovery module. Thus, units can be manufactured separately, and in a standard manner, and the conversion system is comprised of various modules or units assembled on a printed circuit board. Thus, it is not necessary to assemble all the electronic components of the conversion system on a single element. Moreover, this embodiment having the modules facilitates making possible replacement of only a defective module, without replacing the entire converter. A further advantage of this design is the ability to use standard modules, which can be selected in accordance with the desired application.

According to one design, the electrical energy recovery module can comprise at least one inductance, at least one diode, at least one capacitor and at least one commutator. The commutator control permits the recovery of energy and the transfer thereof to electrical energy storage.

According to one embodiment of the invention, the electrical energy recovery module can comprise three branches connected to a single junction point, including:
 a first branch, comprising a commutator,
 a second branch, comprising a diode, and
 a third branch, comprising an inductance.

The printed circuit board of the conversion system can thus be modified in a specific manner for the employment of the design of a soft switching converter which is compatible with high switching frequencies, while minimizing losses associated with the passive circuit which is added for the purpose of the operation of the modulation circuit.

Figure 5A:
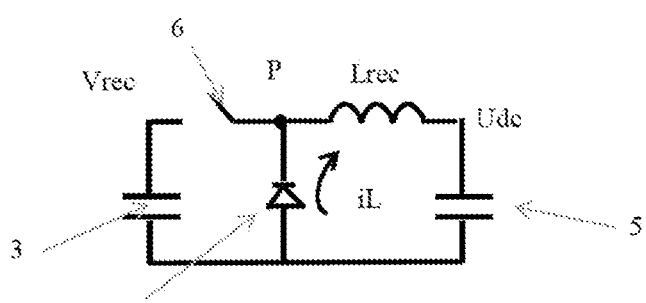
FIG. 5a illustrates an exemplary embodiment of the electrical energy recovery module for a converter according to one form of embodiment of the invention.

FIG. 5a represents, schematically and in non-limiting manner, an electrical energy recovery module of this type. The electrical energy recovery module comprises three branches connected to a single junction point P, including:
 a first branch, comprising a commutator 6,
 a second branch, comprising a diode 4 (in which a current iL flows, as a function of the voltage at its terminals), and
 a third branch, comprising an inductance Lrec.

In FIG. 5a, the capacitor 5 represents the capacitance of the electrical energy storage means (battery), and is not a component of the recovery module. The capacitor 5 is arranged between the inductance Lrec and ground.

Moreover, the capacitor 3 represents the capacitance Crec, and is a component of the recovery module. The capacitor 3 is arranged between the commutator and ground.

The diode 4 is arranged between the junction point of the three branches and ground.

Control of the commutator (the cyclic ratio thereof) makes possible control of the current iL flowing between Vrec and Udc (the current transmitted to the battery).

Accordingly, in consideration of the combination formed by the recovery module and the capacitor of the electrical energy storage, the resulting combination is formed of three parallel branches, arranged between the point P and ground, including:
 a first branch, comprising the commutator 6 and the capacitor 3,
 a second branch, comprising a diode 4, and
 a third branch comprising the inductance Lrec and the capacitance 5 of the electrical energy storage.

When the commutator is closed, the diode is in blocking mode, and the current iL flowing in the coil Lrec (represented in FIG. 5a) is equal to $$\frac{V_{rec} - U_{dc}}{L_{rec}}$$

When the commutator is open, the diode is in conduction mode, and the current iL flowing in the coil Lrec (represented in FIG. 5a) is equal to $$\frac{-U_{dc}}{L_{rec}}.$$

Thus, by controlling the opening and closing time of the commutator, it is possible to control the average value of the current iL, and to achieve an equivalent function of a resistive circuit.

Figure 5B:
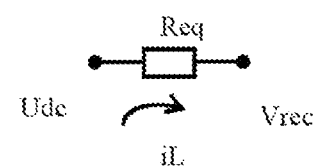

FIG. 5b represents, in a non-limiting manner, an equivalent electrical circuit diagram of the electrical energy recovery module illustrated in FIG. 5a. Thus, the electrical energy recovery module is equivalent to an equivalent resistance Req, in which a current iL flows, but with no dissipation of electrical energy.

In this embodiment, the average current $\bar{i}$ in this electrical energy recovery circuit can be expressed as follows:

$$\bar{i} \cong \frac{V_{rec} - U_{dc}}{L_{rec}} \frac{T}{2} = \frac{V_{rec} - U_{dc}}{2 * L_{rec} * F_{sw}} \cong \frac{V_{rec} - U_{dc}}{Req}$$

wherein:
T is the switching period of the commutator;
Vrec is the recovery voltage;
Udc is the DC input phase voltage;
Lrec is the inductance of the recovery module;
Req is the equivalent resistance; and
Fsw represents the switching frequency of the switches.

Preferably, an energy recovery module of this type is arranged in the conversion system equipped with the modulation circuit, such that the electrical energy recovery module is arranged between one DC input phase of the conversion system and the junction between the commutation arm and the capacitor on the modulation circuit. In the embodiment of FIG. 5a, the electrical energy recovery module can be connected such that:
 The point of the recovery module connected to the DC input phase (at a voltage Udc) of the conversion system corresponds to the point of the third branch of the recovery module between the inductance Lrec and the second capacitor 5 (this capacitor is the capacitance of the battery); and
 The point of the recovery module connected to the junction between the commutation arm (at a voltage Vrec) and the capacitor of the modulation circuit corresponds to the point of the first branch of the recovery module between the commutator 6 and the first capacitor 3.

Figure 6:
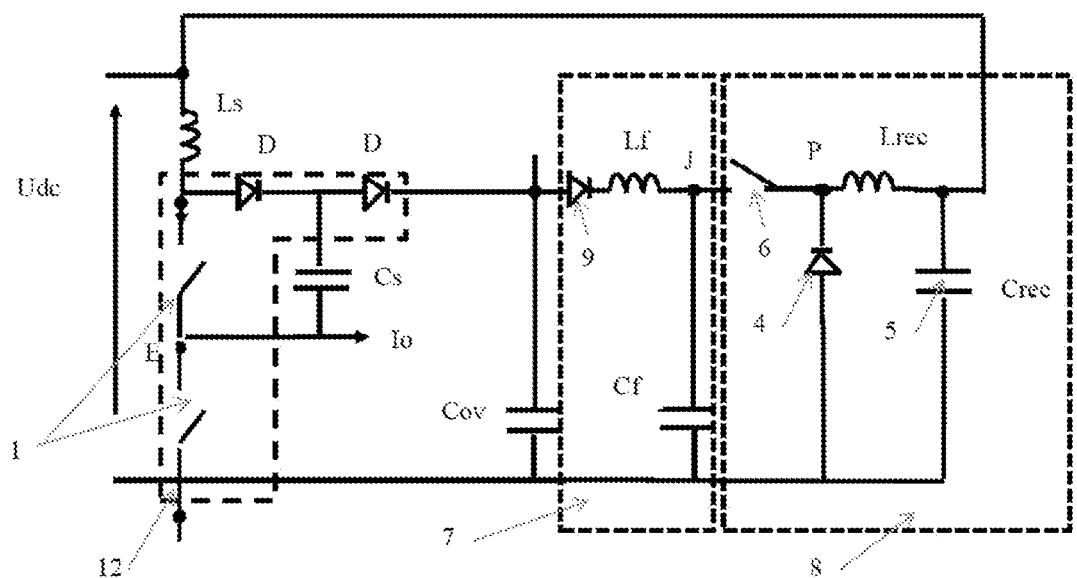
FIG. 6 illustrates an electrical circuit of one phase of a conversion system according to one form of embodiment of the invention.

FIG. 6 illustrates, in a schematic and non-limiting manner, an electrical circuit of a conversion system according to one embodiment of the invention (with a diode connected in series with the filtering coil). In order to facilitate the understanding of this figure, the latter represents the circuit with a single commutation arm for one three-phase output of the conversion system, wherein this circuit is repeated for the other two phases. The conversion system comprises:

- a DC input phase supplied with a voltage Udc, in relation to ground,
- a modulating coil Ls having a first end of which is connected to the DC input phase,
- a commutation arm 12, connected to a second end of the modulating coil Ls, wherein the commutation arm 12 comprises:
  - two series-connected commutators 1 on one branch, connected on one side to the second end of the modulating coil Ls, and on the other side to ground,
  - two series-connected diodes D on one branch, which is connected to the junction point between the second end of the modulating coil Ls, and the branch incorporating the two commutators 1,
  - an AC output E for the current Io, situated at the mid-point between the two commutators 1,
- a modulating capacitor Cs having one end connected to a junction point between the two diodes D on the commutation arm 12, and the other end of which is connected to the output E of the commutation arm 12,
- a capacitor Cov which permits the storage of a proportion of electrical energy, wherein the capacitor Cov is arranged between the end (not connected to the modulating coil Ls) of the branch of the commutation arm 12 which comprises the two diodes D and ground,
- filtering circuit 7, arranged in parallel with the capacitor Cov, that is also connected between the end of the branch of the commutation arm 12 which comprises the two diodes D and ground, wherein the filtering circuit comprises:
  - a unit comprised of a diode 9 connected in series with a filtering coil Lf, executing a filtering function, wherein this unit is connected between the end of the branch on the commutation arm 12 which carries the two diodes D and a junction point J at the end of the filtering coil Lf,
  - a filtering capacitor Cf, connected between this junction point J and ground,
- an electrical energy recovery module 8, identical to that illustrated in FIG. 5*a*, and comprising three branches connected to a junction point P, including:
  - a first branch, comprising a commutator 6, wherein the end of the first branch is connected to the junction point J of the filtering circuit 7,
  - a second branch, comprising a diode 4, wherein the end of the second branch is connected to ground, and
  - a third branch, comprising an inductance Lrec, wherein the end of the third branch is connected to the DC input phase of the conversion system, and
  - a capacitor 5, designated as Crec, connected between the end of the third branch of the electrical energy recovery module 8 (that is connected to the coil Lrec) and ground.

With the embodiment illustrated in FIG. 6, it is possible to use, by way of illustration and not by way of limitation, components with the following ratings:
- Ls~=300 microhenry,
- Cs~=6.8 nF,
- Cov~=2820 nF (6*470 nF: formed of six parallel-connected capacitors),
- Vrec~=1.15 Vbus,
- Lrec=21 microH,
- Crec=27.2 nF (6.8 nF×4: formed of four parallel-connected capacitors),
- Lf=2.2 microH,
- Cf=10 μF+470 nF=10.47 μF, and
- type of commutator: IGBT.

Figure 7:
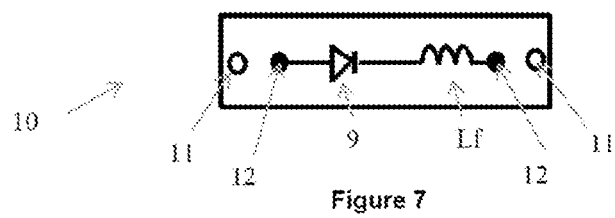
FIG. 7 shows a schematic illustration of a filtering module according to the invention.

FIG. 7 illustrates, in a schematic and non-limiting manner, a filtering module according to one form of embodiment of the invention. The filtering module 10 comprises a diode 9 connected in series with a coil Lf. At the ends of the diode 9 and the coil Lf, the filtering module comprises electrical connections 12 for the purposes of electrical connection with the other elements of the converter. Moreover, the filtering module comprises openings 11 for the attachment thereof to a printed circuit board. Attachment can be achieved by use of screwing, snap-fitting (clip-on attachment), soldering, or any analogous attachment.

According to one variant of embodiment of the invention, the conversion system can comprise at least two current probes for measuring the current in two phases.

According to one variant of embodiment of the invention, the conversion system can comprise at least two isolated voltage probes for measuring the compound voltages between the phases.

These current and voltage sensors can serve to control the commutation arms.

The conversion system according to the invention permits the operation of electrical machines, in all types of applications, specifically for electrical machines with very high speeds of rotation and a high inverter (converter) output.

The converter according to the invention can be designed for an on-board application, specifically in a vehicle, specifically a terrestrial, aeronautical or naval vehicle.

The conversion system according to the invention can also be employed in off-board applications for electrical energy production, including turbines, micro-turbines or wind turbines.

The present invention moreover relates to a motor system comprising at least one storage of electrical energy, for example a battery, and one three-phase electrical machine, for example a permanent magnet electrical machine. The motor system comprises a conversion system according to one of the aforementioned forms of embodiment (or one of the combinations of these forms of embodiment) for the conversion of DC electrical energy from the electrical energy storage into three-phase AC electrical energy for the electrical machine and, potentially, vice versa. Thus, by use of the conversion system, the electrical machine can be operated, while limiting electrical losses. Moreover, if the conversion system is bi-directional (reversible), it is also possible to store (for example in a battery) electrical energy generated by the rotation of the electrical machine.

The invention claimed is:

1. A system for the conversion of DC electrical power into three-phase AC electrical power comprising three commutation arms, a modulation circuit for reducing switching loss and overshoot of voltage and current comprising one capacitor per AC output phase of the system and a coil, and an electrical energy recovery module connected to the commutation arms and to the modulation circuit, wherein the conversion system comprises a filtering circuit for each output phase of the system including a capacitor and an assembly formed from a filtering coil connected in series with a diode.

2. A system according to claim 1, wherein the filtering coil has an inductance ranging between 0.5 and 50 microH.

3. A system according to claim 2, wherein the diode of the filtering circuit is a Schottky diode.

4. A system according to claim 2, wherein each assembly of the filtering circuit formed is mounted on a filtering module.

5. A system according to claim 2, wherein the filtering circuits are positioned between the commutation arms and the electrical energy recovery module.

6. A system according to claim 1, wherein the diode of the filtering circuit is a Schottky diode.

7. A system according to claim 6, wherein the filtering circuits are positioned between the commutation arms and the electrical energy recovery module.

8. A system according to claim 1, wherein each assembly of the filtering circuit formed is mounted on a filtering module.

9. A system according to claim 8, wherein each assembly of the filtering circuit formed is mounted on a filtering module.

10. A system according to claim 8, wherein the filtering circuits are positioned between the commutation arms and the electrical energy recovery module.

11. A system according to claim 8, wherein the electrical energy recovery module includes at least one inductance and at least one commutator.

12. A system according to claim 1, wherein each filtering module is mounted on a printed circuit board, comprising the commutation arms, the modulation circuit and the electrical energy recovery module.

13. A system according to claim 12, wherein the filtering circuits are positioned between the commutation arms and the electrical energy recovery module.

14. A system according to claim 1, wherein the filtering circuits are positioned between the commutation arms and the electrical energy recovery module.

15. A system according to claim 14, wherein the electrical energy recovery module includes at least one inductance and at least one commutator.

16. A system according to claim 1, wherein the electrical energy recovery module includes at least one inductance and at least one commutator.

17. A system according to claim 16, wherein the electrical energy recovery module comprises three branches connected to a single junction point (P), including:
    a first branch comprising a commutator;
    a second branch comprising a diode; and
    a third branch comprising an inductance.

18. A system according to claim 1, wherein the coil of the modulation circuit is positioned between a DC input phase of the conversion system and a junction of the commutation arms.

19. System according to claim 18, wherein each capacitor of the modulation circuit is connected to one AC output phase of the conversion system and to a junction between the coil of the modulation circuit, the commutation arms and a capacitor.

20. A system according to claim 19, wherein the electrical energy recovery module is positioned between a DC input phase of the conversion system and the junction between the commutation arm and the capacitor of the modulation circuit.

21. A system according to claim 1, wherein each commutation arm includes two commutators and two diodes with the output phases of the conversion system being connected to a mid-point of each commutation arm.

22. A system according to claim 1, wherein the conversion system is bidirectional.

23. A motor system comprising at least one electrical energy storage and a three-phase electrical machine, wherein the motor system comprises a conversion system according to claim 1 for converting DC electrical energy from the electrical energy storage into three-phase AC electrical energy for the electrical machine.

* * * * *